US012781358B2

(12) United States Patent
Oikawa

(10) Patent No.: US 12,781,358 B2
(45) Date of Patent: Nov. 3, 2026

(54) CARBON DIOXIDE PROCESS APPARATUS, CARBON DIOXIDE PROCESS METHOD, AND MANUFACTURING METHOD OF CARBON COMPOUND

(71) Applicant: HONDA MOTOR CO., LTD., Tokyo (JP)

(72) Inventor: Hiroshi Oikawa, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 19/059,337

(22) Filed: Feb. 21, 2025

(65) Prior Publication Data

US 2025/0297374 A1 Sep. 25, 2025

(30) Foreign Application Priority Data

Mar. 19, 2024 (JP) ................................ 2024-043415

(51) Int. Cl.

| | |
|---|---|
| ***C25B 9/00*** | (2021.01) |
| ***B01D 53/14*** | (2006.01) |
| ***B01D 53/62*** | (2006.01) |
| ***B01D 53/78*** | (2006.01) |
| ***C25B 3/03*** | (2021.01) |

(Continued)

(52) U.S. Cl.

CPC ............ *C25B 3/26* (2021.01); *B01D 53/1475* (2013.01); *B01D 53/62* (2013.01); *B01D 53/78* (2013.01); *C25B 3/03* (2021.01); *C25B 9/65* (2021.01); *C25B 15/081* (2021.01); *H01M 10/30* (2013.01); *H01M 10/44* (2013.01); *B01D 2251/306* (2013.01); *B01D 2251/604* (2013.01); *B01D 2257/504* (2013.01)

(58) Field of Classification Search

CPC ........... C25B 3/26; C25B 15/081; C25B 3/03; H01M 10/30; H01M 10/44; B01D 53/1475; B01D 53/62; B01D 53/78

See application file for complete search history.

(56) References Cited

U.S. PATENT DOCUMENTS

2022/0307145 A1* 9/2022 Shimada ............... C25B 15/031

FOREIGN PATENT DOCUMENTS

WO 2018/232515 A1 12/2018

* cited by examiner

*Primary Examiner* — Zulmariam Mendez

(74) *Attorney, Agent, or Firm* — Amin, Turocy & Watson, LLP

(57) ABSTRACT

A carbon dioxide process apparatus includes: a recovery device that recovers carbon dioxide; an electrochemical reaction device that electrochemically reduces the carbon dioxide; and an electric energy storage device, the recovery device includes: a carbon dioxide absorption portion, the electric energy storage device includes: an electric energy storage portion constituted of a nickel hydrogen battery, at a time of discharging, an electrolytic solution is circulated in an order of the carbon dioxide absorption portion, a negative electrode-side flow path of the electric energy storage portion, the electrochemical reaction device, a positive electrode-side flow path of the electric energy storage portion, and the carbon dioxide absorption portion, and at a time of charging, the electrolytic solution is circulated in an order of the carbon dioxide absorption portion, the positive electrode-side flow path, the electrochemical reaction device, the negative electrode-side flow path, and the carbon dioxide absorption portion.

5 Claims, 3 Drawing Sheets

(51) Int. Cl.

| | |
|---|---|
| ***C25B 3/26*** | (2021.01) |
| ***C25B 9/65*** | (2021.01) |
| ***C25B 15/08*** | (2006.01) |
| ***H01M 10/30*** | (2006.01) |
| ***H01M 10/44*** | (2006.01) |

CARBON DIOXIDE PROCESS APPARATUS, CARBON DIOXIDE PROCESS METHOD, AND MANUFACTURING METHOD OF CARBON COMPOUND

CROSS-REFERENCE TO RELATED APPLICATION

Priority is claimed on Japanese Patent Application No. 2024-043415, filed on Mar. 19, 2024, the contents of which are incorporated herein by reference.

BACKGROUND

Field of the Invention

The present invention relates to a carbon dioxide process apparatus, a carbon dioxide process method, and a manufacturing method of a carbon compound.

Background

In the related art, efforts aiming at reduction of the impact on or moderation of climate change have been ongoing, and toward the realization of this purpose, research and development related to reduction of carbon dioxide emissions has been conducted. For example, in order to reduce carbon dioxide emissions, a technique is known in which carbon dioxide in an exhaust gas or air is recovered and is electrochemically reduced to obtain valuables. This technique is a promising technique that can achieve carbon neutrality, but an economic efficiency is the largest problem. In order to improve the economic efficiency, it is important to enhance an energy efficiency and reduce the loss of carbon dioxide in the recovery and the reduction of carbon dioxide.

As a technique that recovers carbon dioxide, a technique is known in which carbon dioxide in a gas is physically or chemically adsorbed by a solid or liquid adsorption agent, is then desorbed by energy such as heat, and is utilized. As a technique that electrochemically reduces carbon dioxide, a technique is known in which with respect to a cathode in which a catalyst layer is formed by using a carbon dioxide reduction catalyst on a side of a gas diffusion layer that is in contact with an electrolytic solution, a carbon dioxide gas is supplied from a side of the gas diffusion layer opposite to the catalyst layer and is electrochemically reduced (for example, refer to PCT International Publication No. WO2018/232515).

SUMMARY

However, in the related art, research and development of the technique that recovers carbon dioxide and the technique that electrochemically reduces carbon dioxide has been separately conducted. Therefore, the overall energy efficiency and the loss reduction effect of carbon dioxide when the respective techniques are combined can be determined in a multiplicative manner from the efficiencies of the techniques; however, there is room for further improvement. In this way, it can be significant to enhance the energy efficiency and the loss reduction effect of carbon dioxide from a comprehensive viewpoint of combining the technique that recovers carbon dioxide and the technique that electrochemically reduces carbon dioxide.

In a carbon dioxide process apparatus having a recovery device that recovers carbon dioxide, it is known that when pH of an electrolytic solution that dissolves carbon dioxide is high, a hydrogen generation amount is increased at the time of electrochemical reduction of carbon dioxide, and a decomposition efficiency of carbon dioxide is degraded. On the other hand, in the recovery device of carbon dioxide, the higher pH of the electrolytic solution is advantageous from the viewpoint of an absorption rate of carbon dioxide. A gap in the optimum pH condition of the electrolytic solution between recovery and electrolysis of the carbon dioxide can be a large problem in the carbon dioxide process apparatus.

As described above, when improving a conversion efficiency of carbon dioxide, it is a problem to enhance both a recovery efficiency and an electrolysis efficiency of carbon dioxide.

An aspect of the present invention aims at providing, in a carbon dioxide process apparatus that recovers carbon dioxide and electrochemically reduces the carbon dioxide, a technique that can improve an absorption rate and a decomposition efficiency of the carbon dioxide compared to the related art. Further, the aspect of the present invention contributes to reduction of the impact on or moderation of climate change.

A carbon dioxide process apparatus according to a first aspect of the present invention includes: a recovery device that recovers carbon dioxide; an electrochemical reaction device that electrochemically reduces the carbon dioxide which is recovered by the recovery device; and an electric energy storage device that supplies electric energy to the electrochemical reaction device, wherein the recovery device includes: a carbon dioxide absorption portion that dissolves the carbon dioxide in an electrolytic solution of a strong alkali and absorbs the carbon dioxide, the carbon dioxide that is dissolved in the electrolytic solution by the carbon dioxide absorption portion is supplied to the electrochemical reaction device, the electric energy storage device includes: an electric energy storage portion that is constituted of a nickel hydrogen battery which stores electric energy, the electric energy storage portion includes: a positive electrode; a negative electrode; a separator that is provided between the positive electrode and the negative electrode; a positive electrode-side flow path that is formed between the positive electrode and the separator; and a negative electrode-side flow path that is formed between the negative electrode and the separator, at a time of discharging of the electric energy storage portion, the electrolytic solution is circulated in an order of the carbon dioxide absorption portion, the negative electrode-side flow path of the electric energy storage portion, the electrochemical reaction device, the positive electrode-side flow path of the electric energy storage portion, and the carbon dioxide absorption portion, and at a time of charging of the electric energy storage portion, the electrolytic solution is circulated in an order of the carbon dioxide absorption portion, the positive electrode-side flow path of the electric energy storage portion, the electrochemical reaction device, the negative electrode-side flow path of the electric energy storage portion, and the carbon dioxide absorption portion.

The carbon dioxide process apparatus of the first aspect causes the electrolytic solution to flow from the carbon dioxide absorption portion to the negative electrode-side flow path at the time of discharging and the positive electrode-side flow path at the time of charging of the nickel hydrogen battery. Thereby, since the nickel hydrogen battery adsorbs OH of the electrolytic solution, the electrolytic solution is in a low pH state. When the electrolytic solution is caused to flow through the electrochemical reaction device, a $CO_2$ conversion efficiency of the electrochemical reaction device is increased. Further, the carbon dioxide process apparatus of the first aspect causes the electrolytic solution to flow from the electrochemical reaction device to the negative electrode-side flow path at the time of charging and the positive electrode-side flow path at the time of discharging of the nickel hydrogen battery. Thereby, the nickel hydrogen battery desorbs OH from the electrolytic solution and causes the electrolytic solution to be in a high pH state. If the electrolytic solution is caused to flow through the carbon dioxide absorption portion, a $CO_2$ absorption efficiency of the carbon dioxide absorption portion is increased. Therefore, according to the carbon dioxide process apparatus of the first aspect, a carbon dioxide process efficiency in the entire system is dramatically improved.

A second aspect is the carbon dioxide process apparatus according to the first aspect, wherein the electrochemical reaction device may include: a cathode; an anode; an electrolyte film that is provided between the cathode and the anode; a cathode-side liquid flow path which is provided adjacent to the cathode and through which the electrolytic solution flows; an anode-side liquid flow path which is provided adjacent to the anode and through which the electrolytic solution flows; and a first liquid supply passage that supplies the electrolytic solution which has flowed through the cathode-side liquid flow path to the anode-side liquid flow path.

A third aspect is the carbon dioxide process apparatus according to the first or second aspect, wherein the electric energy storage device may further include: a conversion portion that converts renewable energy into electric energy, and the electric energy storage portion may store the electric energy converted by the conversion portion.

A fourth aspect is the carbon dioxide process apparatus according to any one of the first to third aspects which may further include: a carbon increase reaction device that performs a carbon increase by performing multimerization of an ethylene generated by reducing the carbon dioxide by the electrochemical reaction device.

A fifth aspect is of the present invention is a carbon dioxide process method that electrochemically reduces carbon dioxide, the carbon dioxide process method including: in a carbon dioxide absorption portion, dissolving carbon dioxide in an electrolytic solution; discharging a nickel hydrogen battery that includes a positive electrode, a negative electrode, a separator that is provided between the positive electrode and the negative electrode, a positive electrode-side flow path that is formed between the positive electrode and the separator, and a negative electrode-side flow path that is formed between the negative electrode and the separator; charging the nickel hydrogen battery; in an electrochemical reaction device, reducing the carbon dioxide dissolved in the electrolytic solution by using electric energy of the nickel hydrogen battery; at a time of discharging of the nickel hydrogen battery, circulating the electrolytic solution in an order of the carbon dioxide absorption portion, the negative electrode-side flow path of the nickel hydrogen battery, the electrochemical reaction device, the positive electrode-side flow path of the nickel hydrogen battery, and the carbon dioxide absorption portion; and at a time of charging of the nickel hydrogen battery, circulating the electrolytic solution in an order of the carbon dioxide absorption portion, the positive electrode-side flow path of the nickel hydrogen battery, the electrochemical reaction device, the negative electrode-side flow path of the nickel hydrogen battery, and the carbon dioxide absorption portion.

A carbon compound manufacturing method according to a sixth aspect of the present invention includes: reducing carbon dioxide and manufacturing a carbon compound by the carbon dioxide process method according to the fifth aspect.

According to the aspect of the present invention, in a carbon dioxide process apparatus that recovers carbon dioxide and electrochemically reduces the carbon dioxide, it is possible to improve the absorption rate and the decomposition efficiency of the carbon dioxide compared to the related art.

DESCRIPTION OF EMBODIMENTS

Hereinafter, embodiments of the present invention will be described in detail with reference to the drawings.

[Carbon Dioxide Process Apparatus]

Figure 1:
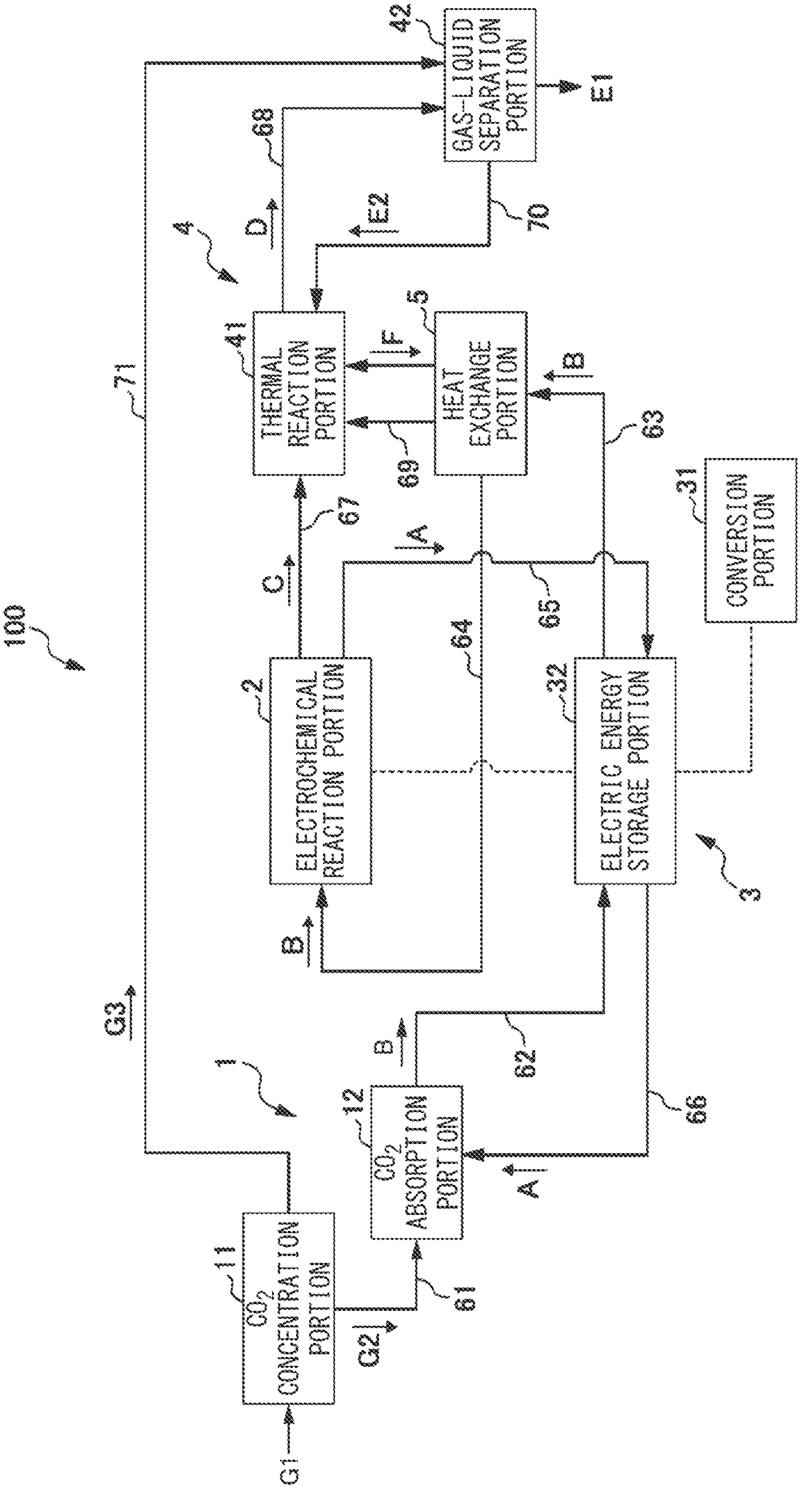
FIG. 1 is a block diagram showing a carbon dioxide process apparatus according to an embodiment of the present invention.

FIG. 1 is a block diagram showing a carbon dioxide process apparatus 100 according to an embodiment of the present invention.

As shown in FIG. 1, a carbon dioxide process apparatus 100 according to the present embodiment includes a recovery device 1, an electrochemical reaction portion 2 (electrochemical reaction device), an electric energy storage device 3, a carbon increase reaction device 4, a heat exchange portion 5. The recovery device 1 includes a $CO_2$ concentration portion 11 and a $CO_2$ absorption portion 12 (carbon dioxide absorption portion). The electrochemical reaction portion 2 includes an electrolysis cell. The electric energy storage device 3 includes a conversion portion 31 and an electric energy storage portion 32. The carbon increase reaction device 4 includes a thermal reaction portion 41 and a gas-liquid separation portion 42.

In the carbon dioxide process apparatus 100, the $CO_2$ concentration portion 11 and the $CO_2$ absorption portion 12 are connected to each other by a gas flow path 61. The $CO_2$ absorption portion 12 and the electric energy storage portion 32 are connected to each other by a liquid flow path 62 and a liquid flow path 66. The electric energy storage portion 32 and the heat exchange portion 5 are connected to each other by a liquid flow path 63. The heat exchange portion 5 and the electrochemical reaction portion 2 are connected to each other by a liquid flow path 64. The electrochemical reaction portion 2 and the electric energy storage portion 32 are connected to each other by a second liquid supply passage 65 which is a liquid flow path. The electrochemical reaction portion 2 and the thermal reaction portion 41 are connected to each other by a gas flow path 67. The thermal reaction portion 41 and the gas-liquid separation portion 42 are connected to each other by a gas flow path 68 and a gas flow path 70. A circulation flow path 69 of a heat medium is provided between the thermal reaction portion 41 and the heat exchange portion 5. The $CO_2$ concentration portion 11 and the gas-liquid separation portion 42 are connected to each other by a gas flow path 71.

Each flow path described above is not particularly limited, and known piping or the like can be appropriately used. A gas supply means such as a compressor, a valve, a measurement device such as a flowmeter, and the like can be appropriately provided on the gas flow paths 61, 67, 68, 70, and 71. Further, a liquid supply means such as a pump, a valve, a measurement device such as a flowmeter, and the like can be appropriately provided on the liquid flow paths 62 to 66.

(Recovery Device)

The recovery device 1 recovers carbon dioxide. A gas G1 that includes carbon dioxide such as air or exhaust gas is supplied to the $CO_2$ concentration portion 11. The $CO_2$ concentration portion 11 concentrates the carbon dioxide in the gas G1. As the $CO_2$ concentration portion 11, a known concentration device can be employed as long as the device can concentrate carbon dioxide. As the $CO_2$ concentration portion 11, for example, a membrane separation device that utilizes a difference in a permeation rate with respect to a membrane or an adsorption separation device that utilizes chemical or physical adsorption or desorption can be used. From the viewpoint of an excellent separation performance, adsorption that utilizes, in particular, temperature swing adsorption of chemisorption is preferable.

A concentration gas G2 in which the carbon dioxide is concentrated by the $CO_2$ concentration portion 11 is supplied to the $CO_2$ absorption portion 12 through the gas flow path 61. Further, a separation gas G3 that is separated from the concentration gas G2 is supplied to the gas-liquid separation portion 42 through the gas flow path 71. In the $CO_2$ absorption portion 12, a carbon dioxide gas in the concentration gas G2 supplied from the $CO_2$ concentration portion 11 comes into contact with an electrolytic solution A, and the carbon dioxide is dissolved in the electrolytic solution A and is absorbed. The method of causing the carbon dioxide gas to come into contact with the electrolytic solution A is not particularly limited, and examples of the method can include a method of performing bubbling by blowing the concentration gas G2 into the electrolytic solution A.

In the $CO_2$ absorption portion 12, an electrolytic solution A constituted of a strong alkaline aqueous solution is used as an absorption liquid that absorbs carbon dioxide. In the carbon dioxide, since the oxygen atom strongly attracts the electron, the carbon atom has a positive electric charge (δ+). Therefore, in the strong alkaline aqueous solution in which a large amount of hydroxide ions are present, with respect to the carbon dioxide, a dissolution reaction tends to proceed from a hydrated state through $HCO_3^-$ to $CO_3^{2-}$, and the state becomes an equilibrium state in which the abundance ratio of $CO_3^{2-}$ is high. Therefore, the carbon dioxide is more easily dissolved in the strong alkaline aqueous solution than other gases such as nitrogen, hydrogen, and oxygen, and the carbon dioxide in the concentration gas G2 is selectively absorbed by the electrolytic solution A in the $CO_2$ absorption portion 12. In this way, by using the electrolytic solution A in the $CO_2$ absorption portion 12, concentration of the carbon dioxide can be promoted. Therefore, it is not necessary to concentrate the carbon dioxide to a high concentration in the $CO_2$ concentration portion 11, and it is possible to reduce the energy required for the concentration in the $CO_2$ concentration portion 11.

An electrolytic solution B in which the carbon dioxide is absorbed in the $CO_2$ absorption portion 12 is sent to the electrochemical reaction portion 2 through the liquid flow path 62, the electric energy storage portion 32, the liquid flow path 63, the heat exchange portion 5, and the liquid flow path 64. Further, the electrolytic solution A that flows out from the electrochemical reaction portion 2 is sent to the $CO_2$ absorption portion 12 through the second liquid supply passage 65, the electric energy storage portion 32, and the liquid flow path 66. In this way, in the carbon dioxide process apparatus 100, the electrolytic solution is circulated among the $CO_2$ absorption portion 12, the electric energy storage portion 32, and the electrochemical reaction portion 2. Examples of the strong alkaline aqueous solution used for the electrolytic solution A include a potassium hydroxide aqueous solution and a sodium hydroxide aqueous solution. In particular, the potassium hydroxide aqueous solution is preferably used from the viewpoint that the solubility of carbon dioxide in the $CO_2$ absorption portion 12 is excellent, and the reduction of carbon dioxide in the electrochemical reaction portion 2 is promoted.

(Electrochemical Reaction Portion)

Figure 2:
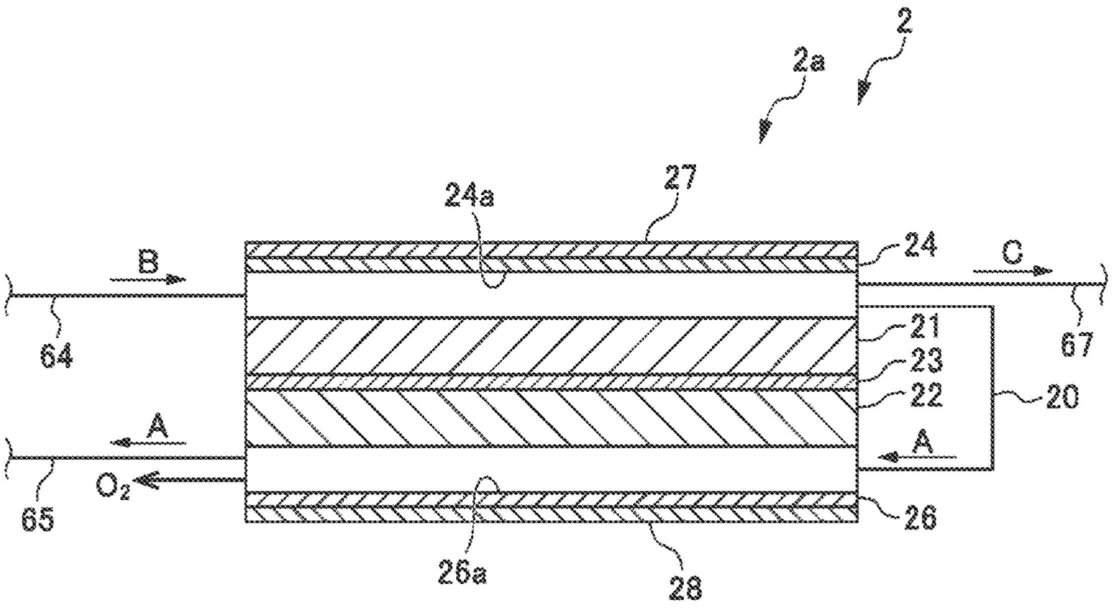
FIG. 2 is a schematic cross-sectional view showing an example of an electrolysis cell of an electrochemical reaction portion.

FIG. 2 is a schematic cross-sectional view showing an example of an electrolysis cell 2*a* of the electrochemical reaction portion 2. The electrochemical reaction portion 2 electrochemically reduces carbon dioxide by the electrolysis cell 2*a*. As shown in FIG. 2, the electrolysis cell 2*a* of the electrochemical reaction portion 2 includes a cathode 21, an anode 22, an anion exchange membrane 23 (electrolyte film), a cathode-side liquid flow path structure 24 that forms a cathode-side liquid flow path 24*a*, an anode-side liquid flow path structure 26 that forms an anode-side liquid flow path 26*a*, an electric power supply body 27, and an electric power supply body 28. Although one electrolysis cell 2*a* is shown in FIG. 2, the electrochemical reaction portion 2 can preferably include an electrolysis cell stack formed by stacking a plurality of electrolysis cells 2*a*.

In the electrolysis cell 2*a* of the electrochemical reaction portion 2, the electric power supply body 27, the cathode-side liquid flow path structure 24, the cathode 21, the anion exchange membrane 23, the anode 22, the anode-side liquid flow path structure 26, and the electric power supply body 28 are stacked in this order. Further, the cathode-side liquid flow path 24*a* is formed between the cathode 21 and the cathode-side liquid flow path structure 24. The anode-side liquid flow path 26*a* is formed between the anode 22 and the anode-side liquid flow path structure 26. The cathode-side liquid flow path 24*a* and the anode-side liquid flow path 26*a* are provided at positions that face each other across the cathode 21, the anion exchange membrane 23, and the anode 22. A plurality of cathode-side liquid flow paths 24*a* and a plurality of anode-side liquid flow paths 26*a* can be preferably provided. The shape of the cathode-side liquid flow path 24*a* and the anode-side liquid flow path 26*a* may be a straight line or a zigzag shape.

The electric power supply body 27 and the electric power supply body 28 are electrically connected to the electric energy storage portion 32 of the electric energy storage device 3. Further, both the cathode-side liquid flow path structure 24 and the anode-side liquid flow path structure 26 are electric conductors and can apply a voltage between the cathode 21 and the anode 22 by electric power supplied from the electric energy storage portion 32.

The cathode 21 is an electrode that reduces carbon dioxide to generate a carbon compound, and also reduces water to generate hydrogen. Examples of the cathode 21 can include an electrode that includes a gas diffusion layer and a cathode catalyst layer formed on the cathode-side liquid flow path 24*a* side of the gas diffusion layer.

The cathode catalyst layer may be arranged such that part of the cathode catalyst layer enters the inside of the gas diffusion layer. Further, a porous layer that is denser than the gas diffusion layer may be arranged between the gas diffusion layer and the cathode catalyst layer.

A known catalyst that promotes reduction of carbon dioxide can be used as a cathode catalyst that forms the cathode catalyst layer. Specific examples of the cathode catalyst can include metals such as gold, silver, copper, platinum, palladium, nickel, cobalt, iron, manganese, titanium, cadmium, zinc, indium, gallium, lead, and tin, alloys thereof, intermetallic compounds, and metal complexes such as ruthenium complexes and rhenium complexes. Among them, from the viewpoint of promoting reduction of carbon dioxide, copper and silver are preferable, and copper is more preferably used. As the cathode catalyst, one type may be used alone, or two or more types may be used in combination. As the cathode catalyst, a supported catalyst in which metallic particles are supported by a carbon material (carbon particles, carbon nanotubes, graphene, or the like) may be used.

The gas diffusion layer of the cathode 21 is not particularly limited, and examples of the gas diffusion layer can include a carbon paper and a carbon cloth. The manufacturing method of the cathode 21 is not particularly limited, and examples of the manufacturing method can include a method in which a slurry of a liquid composition including the cathode catalyst is applied on a surface of the gas diffusion layer on the cathode-side liquid flow path 24*a* side and is dried.

The anode 22 is an electrode that oxidizes a hydroxide ion and generates oxygen. Examples of the anode 22 can include an electrode that includes a gas diffusion layer and an anode catalyst layer formed on the anode-side liquid flow path 26*a* side of the gas diffusion layer. The anode catalyst layer may be arranged such that part of the anode catalyst layer enters the inside of the gas diffusion layer. Further, a porous layer that is denser than the gas diffusion layer may be arranged between the gas diffusion layer and the anode catalyst layer.

An anode catalyst that forms the anode catalyst layer is not particularly limited, and a known anode catalyst can be used. Specific examples can include metals such as platinum, palladium, and nickel, alloys thereof, intermetallic compounds, metal oxides such as manganese oxides, iridium oxides, nickel oxides, cobalt oxides, iron oxides, tin oxides, indium oxides, ruthenium oxides, lithium oxides, and lanthanum oxides, and metal complexes such as ruthenium complexes and rhenium complexes. As the anode catalyst, one type may be used alone, or two or more types may be used in combination.

Examples of the gas diffusion layer of the anode 22 can include a carbon paper and a carbon cloth. Further, as the gas diffusion layer, porous bodies such as mesh materials, punched materials, madreporites, and metallic fiber sintered bodies may be used. Examples of the material of the porous bodies can include metals such as titanium, nickel, and iron, and alloys thereof (for example, SUS).

Examples of the material of the cathode-side liquid flow path structure 24 and the anode-side liquid flow path structure 26 can include metals such as titan and SUS, and carbon.

Examples of the material of the electric power supply body 27 and the electric power supply body 28 can include metals such as copper, gold, titanium, and SUS, and carbon. A structure obtained by applying a plating process such as gold plating on a surface of a copper base material may be used as the electric power supply body 27 and the electric power supply body 28.

The electrolysis cell 2*a* of the electrochemical reaction portion 2 is a flow cell in which the electrolytic solution B supplied from the $CO_2$ absorption portion 12 and sent via the electric energy storage portion 32 and the heat exchange portion 5 flows into the cathode-side liquid flow path 24*a*. Then, by applying a voltage to the cathode 21 and the anode 22, the dissolved carbon dioxide in the electrolytic solution B that flows through the cathode-side liquid flow path 24*a* is electrochemically reduced by the cathode 21, and a carbon compound and hydrogen are generated. The electrolytic solution B at an entrance of the cathode-side liquid flow path 24*a* is in a weak alkali state in which the abundance ratio of $CO_3^{2-}$ is high since the carbon dioxide is dissolved. On the other hand, a dissolved carbon dioxide amount, that is, a $CO_3^{2-}$ amount in the electrolytic solution is decreased as the electrolytic solution flows through the cathode-side liquid flow path 24*a*, and the reduction proceeds, and thereby, the electrolytic solution becomes an electrolytic solution A in a strong alkali state at an exit of the cathode-side liquid flow path 24*a*.

Examples of the carbon compound generated by reducing carbon dioxide by the cathode 21 can include carbon monoxide, ethylene, and the like. For example, the following reaction proceeds, and thereby, carbon monoxide and ethylene are generated as gaseous products. In the cathode 21, hydrogen is also generated by the following reaction. The generated carbon compound in a gas form and hydrogen flow out from the exit of the cathode-side liquid flow path 24*a*.

$$CO_2+H_2O \rightarrow CO+2OH^-$$

$$2CO+8H_2O \rightarrow C_2H_4+8OH^-+2H_2O$$

$$2H_2O \rightarrow H_2+2OH^-$$

The hydroxide ion generated by the cathode 21 passes through the anion exchange membrane 23, moves to the anode 22, and is oxidized by the following reaction to generate oxygen. The generated oxygen passes through the gas diffusion layer of the anode 22, flows into the anode-side liquid flow path 26*a*, and flows out from the exit of the anode-side liquid flow path 26*a*.

$$4OH^- \rightarrow O_2+2H_2O$$

In this way, in the carbon dioxide process apparatus 100, the electrolytic solution used in the electrochemical reaction portion 2 is shared as an absorption solution of the $CO_2$ absorption portion 12, and the carbon dioxide is supplied to the electrochemical reaction portion 2 while being dissolved in the electrolytic solution B and is electrochemically reduced. Thereby, for example, compared to the case where carbon dioxide is adsorbed by an adsorption agent, is desorbed by heating, and is reduced, the energy required for desorption of carbon dioxide is reduced, and it is possible to enhance the energy efficiency.

Here, in the reduction reaction of the carbon dioxide that proceeds at the cathode 21, a by-product is also generated in addition to the carbon compound such as ethylene as a target. Specifically, by-products such as methanol, ethanol, acetic acid, and formic acid are generated, the by-products are dissolved in the electrolytic solution, and it is difficult to separate the by-products. Therefore, the loss of carbon dioxide occurs, and reduction of the loss is desired.

Specifically, at the cathode 21, the following reduction reaction of carbon dioxide proceeds, and thereby, methanol, ethanol, acetic acid, and formic acid are generated. Therefore, the electrolytic solution A that has flowed through the cathode-side liquid flow path 24*a* includes the by-products such as the methanol, ethanol, acetic acid, and formic acid.

$$2CO_3^{2-}+12H_2O+12e^-\rightarrow 2CH_3OH+16OH^- 2CO_3^{2-}+11H_2O+12e^-\rightarrow C_2H_5OH+16OH^- 2CO_3^{2-}+8H_2O+8e^-\rightarrow CH_3COOH+12OH^- 2CO_3^{2-}+6H_2O+4e^-\rightarrow 2HCOOH+8OH^-$$

On the other hand, the electrolysis cell 2*a* of the electrochemical reaction portion 2 according to the present embodiment may include a first liquid supply passage 20 that supplies the electrolytic solution A that has flowed through the cathode-side liquid flow path 24*a* to the anode-side liquid flow path 26*a*. The first liquid supply passage 20 supplies the electrolytic solution A that flows out from the exit of the cathode-side liquid flow path 24*a* and includes the by-products such as the methanol, ethanol, acetic acid, and formic acid into the anode-side liquid flow path 26*a* from the entrance of the anode-side liquid flow path 26*a*. Thereby, the by-products such as the methanol, ethanol, acetic acid, and formic acid are oxidized by an oxidation reaction that proceeds at the anode 22 and are recovered in a form of carbon dioxide ($CO_3^{2-}$) and electron ($e^-$).

Specifically, at the anode 22, the oxidation reaction of the by-products such as the methanol, ethanol, acetic acid, and formic acid as described below proceeds, and thereby, the by-products are converted into the form of carbon dioxide ($CO_3^{2-}$) and electron ($e^-$). The electrolytic solution A which has flowed through the anode-side liquid flow path 26*a* and in which the by-products are converted into the form of carbon dioxide ($CO_3^{2-}$) and electron ($e^-$) is supplied by the second liquid supply passage 65 to the nickel hydrogen battery that constitutes the electric energy storage portion 32 described later. In this way, in the electrolysis cell 2*a* of the electrochemical reaction portion 2 according to the present embodiment, it is possible to recover and recycle carbon dioxide, it is possible to reduce the loss of carbon dioxide, and it is possible to improve the energy efficiency.

$$2CH_3OH+16OH^-\rightarrow 2CO_3^{2-}+12H_2O+12e^- C_2H_5OH+16OH^-\rightarrow 2CO_3^{2-}+11H_2O+12e^- CH_3COOH+12OH^-\rightarrow 2CO_3^{2-}+8H_2O+8e^- 2HCOOH+8OH^-\rightarrow 2CO_3^{2-}+6H_2O+4e^-$$

(Electric Energy Storage Device)

With reference back to FIG. 1, the electric energy storage device 3 is a device that supplies electric power to the electrochemical reaction portion 2. In the conversion portion 31, renewable energy is converted into electric energy. The conversion portion 31 is not particularly limited, and examples of the conversion portion 31 can include a wind turbine generator, a photovoltaic generator, a geothermal generator, and the like. A single conversion portion 31 or a plurality of conversion portions 31 may be included in the electric energy storage device 3.

The electric energy storage portion 32 is electrically connected to the conversion portion 31. The electric energy storage portion 32 stores the electric energy converted by the conversion portion 31. By storing the converted electric energy in the electric energy storage portion 32, electric power can be stably supplied to the electrochemical reaction portion 2 even in a period of time when the conversion portion 31 does not generate electricity. Further, when renewable energy is utilized, the voltage variation generally tends to be large; however, by once storing the converted electric energy in the electric energy storage portion 32, electric power can be supplied at a stable voltage to the electrochemical reaction portion 2.

The electric energy storage portion 32 of the present embodiment is constituted of a nickel hydrogen battery.

Figure 3A:
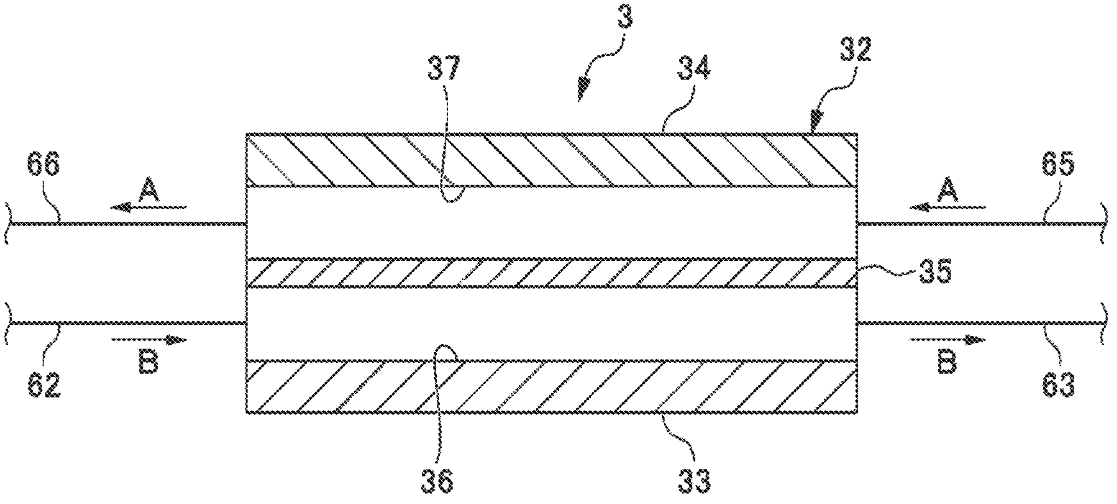
FIG. 3A is a view showing a nickel hydrogen battery of an electric energy storage portion at the time of charging.
Figure 3B:
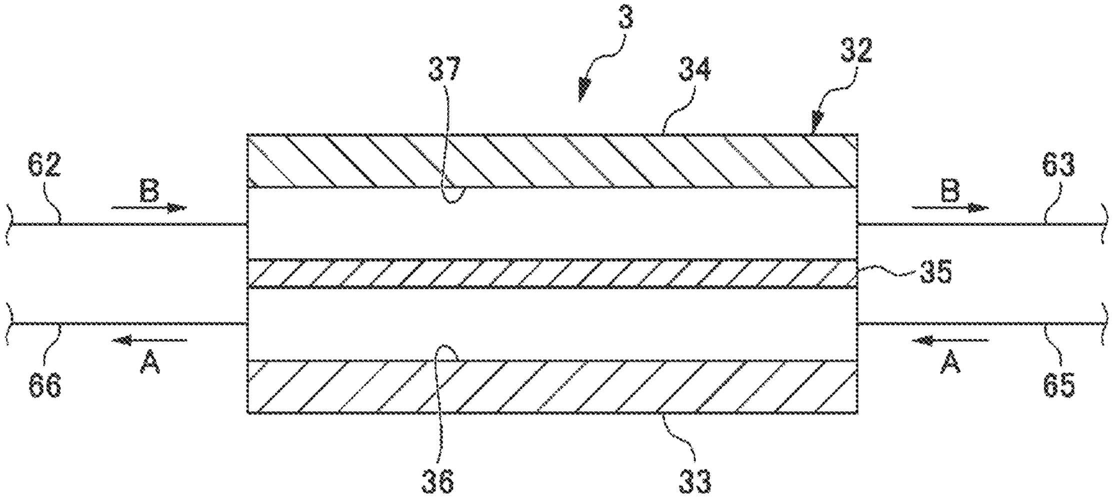
FIG. 3B is a view showing the nickel hydrogen battery of the electric energy storage portion at the time of discharging.

Here, FIG. 3A is a view showing a nickel hydrogen battery of the electric energy storage portion 32 at the time of charging. FIG. 3B is a view showing the nickel hydrogen battery of the electric energy storage portion 32 at the time of discharging. As shown in FIG. 3A and FIG. 3B, the electric energy storage portion 32 is a nickel hydrogen battery including a positive electrode 33, a negative electrode 34, a separator 35 that is provided between the positive electrode 33 and the negative electrode 34, a positive electrode-side flow path 36 that is formed between the positive electrode 33 and the separator 35, and a negative electrode-side flow path 37 that is formed between the negative electrode 34 and the separator 35. The positive electrode-side flow path 36 and the negative electrode-side flow path 37 can be formed, for example, by using a liquid flow path structure similar to those of the cathode-side liquid flow path 24*a* and the anode-side liquid flow path 26*a* of the electrochemical reaction portion 2.

Examples of the positive electrode 33 can include one in which a positive electrode active material is applied to a positive electrode-side flow path 36 side of a positive electrode electricity collection body. The positive electrode electricity collection body is not particularly limited, and examples of the positive electrode electricity collection body can include a nickel foil and a nickel-coated metal foil. The positive electrode active material is not particularly limited, and examples of the positive electrode active material can include nickel hydroxide and nickel oxyhydroxide.

Examples of the negative electrode 34 can include one in which a negative electrode active material is applied to a negative electrode-side flow path 37 side of a negative electrode electricity collection body. The negative electrode electricity collection body is not particularly limited, and examples of the negative electrode electricity collection body can include a nickel mesh. The negative electrode active material is not particularly limited, and examples of the negative electrode active material can include a known hydrogen storage alloy.

The separator 35 is not particularly limited, and examples of the separator 35 can include an ion exchange membrane.

The nickel hydrogen battery of the electric energy storage portion 32 is a flow cell in which the electrolytic solution flows through each of the positive electrode-side flow path 36 on the positive electrode 33 side of the separator 35 and the negative electrode-side flow path 37 on the negative electrode 34 side of the separator 35. In the carbon dioxide process apparatus 100 of the present embodiment, the electrolytic solution B supplied from the $CO_2$ absorption portion 12 through the liquid flow path 62 and the electrolytic solution A supplied from the electrochemical reaction portion 2 through the second liquid supply passage 65 are supplied to and flow through the positive electrode-side flow path 36 and the negative electrode-side flow path 37, respectively.

Further, each connection of the liquid flow path 62 and the liquid flow path 63 to the electric energy storage portion 32 can be switched between a state of connection to the positive electrode-side flow path 36 and a state of connection to the negative electrode-side flow path 37, for example, by a switching valve or the like. Similarly, each connection of the second liquid supply passage 65 and the liquid flow path 66 to the electric energy storage portion 32 can be switched between a state of connection to the positive electrode-side flow path 36 and a state of connection to the negative electrode-side flow path 37, for example, by a switching valve or the like. The carbon dioxide process apparatus 100 may include a control portion that controls a switching means of the flow path.

As described later, the control portion can control the switching means in accordance with a nickel hydrogen battery charging-discharging state of the electric energy storage device 3.

Figure 4:
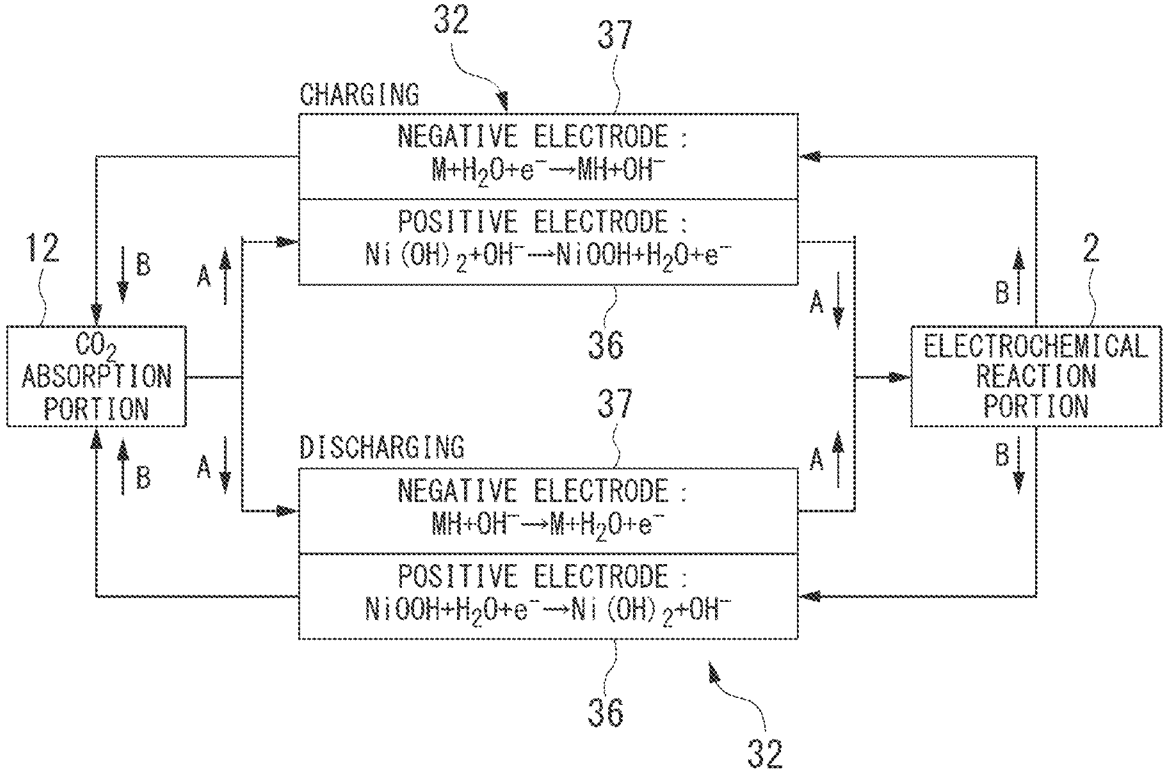
FIG. 4 is a block diagram showing a circulation path of an electrolytic solution at the time of charging and at the time of discharging.

Here, as shown in FIG. 4, at the time of discharging of the nickel hydrogen battery, at the positive electrode 33, the following chemical reaction occurs.

$$NiOOH+H_2O+e^- \rightarrow Ni(OH)_2+OH^-$$

At the time of discharging of the nickel hydrogen battery, at the negative electrode 34, the following chemical reaction occurs.

$$MH+OH^- \rightarrow M+H_2O+e^-$$

That is, at the time of discharging of the nickel hydrogen battery, a hydroxide ion is generated from a water molecule at the positive electrode 33, and the hydroxide ion that has moved to the negative electrode 34 receives a hydrogen ion from the hydrogen storage alloy to generate a water molecule. Then, pH of the electrolytic solution becomes high at the positive electrode-side flow path 36, and pH of the electrolytic solution becomes low at the negative electrode-side flow path 37.

This chemical reaction is utilized for optimization of pH of the electrolytic solution in the $CO_2$ absorption portion 12 and the electrochemical reaction portion 2. In the electrochemical reaction portion 2, when pH of the electrolytic solution is decreased, a hydrogen generation amount at the time of electrochemical reduction of carbon dioxide is reduced, and a decomposition efficiency of carbon dioxide can be enhanced. Further, in the $CO_2$ absorption portion 12, when pH of the electrolytic solution is increased, an absorption rate of carbon dioxide can be increased. Therefore, at the time of discharging, as shown in FIG. 3B, the liquid flow path 62 and the liquid flow path 63 are connected to the negative electrode-side flow path 37, and the second liquid supply passage 65 and the liquid flow path 66 are connected to the positive electrode-side flow path 36. The electrolytic solution B that is supplied from the $CO_2$ absorption portion 12 flows through the negative electrode-side flow path 37, and the electrolytic solution A that is supplied from the electrochemical reaction portion 2 flows through the positive electrode-side flow path 36. Thereby, as shown in a lower side of FIG. 4, at the time of discharging, the electrolytic solution is circulated in the order of the $CO_2$ absorption portion 12, the negative electrode-side flow path 37 of the electric energy storage portion 32, the electrochemical reaction portion 2, the positive electrode-side flow path 36 of the electric energy storage portion 32, and the $CO_2$ absorption portion 12.

Further, as shown in FIG. 4, at the time of charging of the nickel hydrogen battery, at the positive electrode 33, the following chemical reaction occurs.

$$Ni(OH)_2+OH^- \rightarrow NiOOH+H_2O+e^-$$

At the time of charging of the nickel hydrogen battery, at the negative electrode 34, the following chemical reaction occurs.

$$M+H_2O+e^- \rightarrow MH+OH^-$$

That is, at the time of charging of the nickel hydrogen battery, a water molecule is generated from a hydroxide ion at the positive electrode 33, the water molecule is decomposed into a hydrogen atom and a hydroxide ion at the negative electrode 34, and the hydrogen atom is occluded in the hydrogen storage alloy.

This chemical reaction is also utilized for optimization of pH of the electrolytic solution in the $CO_2$ absorption portion 12 and the electrochemical reaction portion 2. At the time of charging, as shown in FIG. 3A, the liquid flow path 62 and the liquid flow path 63 are connected to the positive electrode-side flow path 36, and the second liquid supply passage 65 and the liquid flow path 66 are connected to the negative electrode-side flow path 37. The electrolytic solution B that is supplied from the $CO_2$ absorption portion 12 flows through the positive electrode-side flow path 36, and the electrolytic solution A that is supplied from the electrochemical reaction portion 2 flows through the negative electrode-side flow path 37. Thereby, as shown in an upper side of FIG. 4, at the time of charging, the electrolytic solution is circulated in the order of the $CO_2$ absorption portion 12, the positive electrode-side flow path 36 of the electric energy storage portion 32, the electrochemical reaction portion 2, the negative electrode-side flow path 37 of the electric energy storage portion 32, and the $CO_2$ absorption portion 12.

In the present embodiment, by suitably switching the electrolytic solutions that flow through the positive electrode-side flow path 36 and the negative electrode-side flow path 37 of the electric energy storage portion 32, pH of the electrolytic solution in the electrochemical reaction portion 2 is decreased, and pH of the electrolytic solution in the $CO_2$ absorption portion 12 is increased. Thereby, an absorption efficiency and a reduction efficiency of carbon dioxide can be dramatically improved. The pH of the electrolytic solution is not particularly limited; however, for example, in the liquid flow path 62 that supplies the electrolytic solution B from the $CO_2$ absorption portion 12 to the electric energy storage portion 32, pH of the electrolytic solution B may be within a range of 13.0±1.0. In the liquid flow path 63 and the liquid flow path 64 that supply the electrolytic solution B from the electric energy storage portion 32 to the electrochemical reaction portion 2, pH of the electrolytic solution B may be within a range of 11.5±1.0. In the liquid flow path 65 that supplies the electrolytic solution A from the electrochemical reaction portion 2 to the electric energy storage portion 32, pH of the electrolytic solution A may be within a range of 12.0±1.0. In the liquid flow path 66 that supplies the electrolytic solution A from the electric energy storage portion 32 to the $CO_2$ absorption portion 12, pH of the electrolytic solution A may be in a range of 13.5±1.0. Thereby, a conversion efficiency of carbon dioxide is further improved.

The number of the electric energy storage portion 32 may be two or more. In this case, a circulation path of the electrolytic solution can preferably be changed as appropriate. For example, a carbon dioxide process apparatus that has a photovoltaic generator as the conversion portion 31 and has nickel hydrogen batteries A, B, C and D as the electric energy storage portion 32 can be operated as described in Table 1 described below.

TABLE 1

| TIME PERIOD | ELECTRICITY GENERATION AMOUNT | BATTERY A | BATTERY B | BATTERY C | BATTERY D | ELECTRIC POWER CONSUMPTION BY ELECTROLYSIS |
|---|---|---|---|---|---|---|
| INITIAL STATE | — | 4 kW | 12 kWh | 12 kWh | 4 kW | — |
| FIRST DAY 0:00 TO 8:00 | 0 kW | 0 kWh (REMAINING AMOUNT: 4) | −8 kWh (REMAINING AMOUNT: 4) | 0 kWh REMAINING AMOUNT: 12) | 0 kWh (REMAINING AMOUNT: 4) | 8 kWh FROM BATTERY B |
| FIRST DAY 8:00 TO 16:00 | 4.5 kW × 8 h | +8 kWh (REMAINING AMOUNT: 12) | +8 kWh (REMAINING AMOUNT: 12) | −8 kWh (REMAINING AMOUNT: 4) | +8 kWh (REMAINING AMOUNT: 12) | 8 kWh FROM BATTERY C |
| FIRST DAY 16:00 TO 24:00 | 0 kW | 0 kWh (REMAINING AMOUNT: 12) | 0 kWh (REMAINING AMOUNT: 12) | 0 kW (REMAINING AMOUNT: 4) | −8 kWh (REMAINING AMOUNT: 4) | 8 kWh FROM BATTERY D |
| SECOND DAY 0:00 TO 8:00 | 0 kW | −8 kWh (REMAINING AMOUNT: 4) | 0 kWh (REMAINING AMOUNT: 12) | 0 kWh (REMAINING AMOUNT: 4) | 0 kWh (REMAINING AMOUNT: 4) | 8 kWh FROM BATTERY A |
| SECOND DAY 8:00 TO 16:00 | 4. 5 kW × 8 h | +8 kWh (REMAINING AMOUNT: 12) | −8 kWh (REMAINING AMOUNT: 4) | +8 kWh (REMAINING AMOUNT: 12) | +8 kWh (REMAINING AMOUNT: 12) | 8 kWh FROM BATTERY B |
| SECOND DAY 16:00 TO 24:00 | 0 kW | 0 kWh REMAINING AMOUNT: 12) | 0 kWh (REMAINING AMOUNT: 4) | −8 kWh (REMAINING AMOUNT: 4) | 0 kWh (REMAINING AMOUNT: 12) | 8 kWh FROM BATTERY C |
| THIRD DAY 0:00 TO 8:00 | 0 kW | 0 kWh (REMAINING AMOUNT: 12) | 0 kWh (REMAINING AMOUNT: 4) | 0 kWh REMAINING AMOUNT: 4) | −8 kWh (REMAINING AMOUNT: 4) | 8 kWh FROM BATTERY D |
| THIRD DAY 8:00 TO 16:00 | 4.5 kW × 8 h | −8 kWh (REMAINING AMOUNT: 4) | +8 kWh (REMAINING AMOUNT: 12) | +8 kWh (REMAINING AMOUNT: 12) | +8 kWh (REMAINING AMOUNT: 12) | 8 kWh FROM BATTERY A |
| THIRD DAY 16:00 TO 24:00 | 0 kW | 0 kWh (REMAINING AMOUNT: 4) | −8 kWh (REMAINING AMOUNT: 4) | 0 kWh (REMAINING AMOUNT: 12) | 0 kWh (REMAINING AMOUNT: 12) | 8 kWh FROM BATTERY B |

In a time period from 0:00 to 8:00 of the first day, the electricity generation amount in the conversion portion 31 is zero. In this time period, electric energy is supplied from the battery B to the electrochemical reaction portion 2. Further, in this time period, the electrolytic solution is circulated in the order of the $CO_2$ absorption portion 12, the negative electrode-side flow path 37 of the battery B, the electrochemical reaction portion 2, the positive electrode-side flow path 36 of the battery B, and the $CO_2$ absorption portion 12. In the battery A, the battery C, and the battery D, neither charging nor discharging is performed. In the positive electrode-side flow path 36 and the negative electrode-side flow path 37 of each of the battery A, the battery C, and the battery D, the electrochemical reaction does not proceed. Accordingly, in this time period, it is not necessary to circulate the electrolytic solution in the positive electrode-side flow path 36 and the negative electrode-side flow path 37 of each of the battery A, the battery C, and the battery D. On the other hand, when the circulation amount of the electrolytic solution is insufficient by circulating the electrolytic solution only in the battery B, the circulation amount may be ensured by utilizing the battery A, the battery C, and the battery D simply as a flow path of the electrolytic solution.

In a time period from 8:00 to 16:00 of the first day, electricity generation is performed in the conversion portion 31. In this time period, the battery A, the battery B, and the battery D are charged. Further, in this time period, electric energy is supplied from the battery C to the electrochemical reaction portion 2. In this time period, regarding the battery C in which discharging is performed, the electrolytic solution is circulated as in the lower side of FIG. 4. Further, regarding the battery A, the battery B, and the battery D in which charging is performed, the electrolytic solution is circulated as in the upper side of FIG. 4.

In a time period from 16:00 to 24:00 of the first day, the electricity generation amount in the conversion portion 31 is zero. In this time period, electric energy is supplied from the battery D to the electrochemical reaction portion 2. Further, in this time period, the electrolytic solution is circulated in the order of the $CO_2$ absorption portion 12, the negative electrode-side flow path 37 of the battery D, the electrochemical reaction portion 2, the positive electrode-side flow path 36 of the battery D, and the $CO_2$ absorption portion 12. In the battery A, the battery B, and the battery C, neither charging nor discharging is performed. Accordingly, in this time period, it is not necessary to circulate the electrolytic solution in the positive electrode-side flow path 36 and the negative electrode-side flow path 37 of each of the battery A, the battery B, and the battery C, and the batteries may be utilized simply as a flow path of the electrolytic solution.

On the second day and thereafter, it is possible to perform charging and discharging of the battery A to the battery D as appropriate in accordance with a remaining amount of electric energy. By appropriately switching the circulation path of the electrolytic solution in the plurality of batteries in accordance with a charging-discharging state of the batteries, it is possible to further improve an absorption efficiency and a reduction efficiency of carbon dioxide.

As described above, the photovoltaic generator generates electricity only for the time of about one-third of a day. However, when the photovoltaic generator is used as the conversion portion 31, the electric energy storage portion 32 functions not only as an adjustment means of an OH- concentration but also as an electricity storage device that extends operation hours of the electrochemical reaction portion 2, and it is possible to contribute to an improvement of a carbon dioxide process efficiency.

(Carbon Increase Reaction Device)

With reference back to FIG. 1, the carbon increase reaction device 4 is a device that performs a carbon increase by performing multimerization of an ethylene generated by reducing carbon dioxide by the electrochemical reaction device 2. An ethylene gas C generated by the reduction at the cathode 21 of the electrochemical reaction portion 2 is sent to the thermal reaction portion 41 through the gas flow path 67. In the thermal reaction portion 41, a multimerization reaction of ethylene is performed in the presence of an olefin multimerization catalyst. Thereby, for example, it is possible to manufacture an olefin having an increased carbon such as 1-butene, 1-hexene, or 1-octene.

The olefin multimerization catalyst is not particularly limited, and a known catalyst used for a multimerization reaction can be used. Examples of the olefin multimerization catalyst can include a solid acid catalyst that uses silica alumina or zeolite as a carrier, and a transition metal complex compound.

In the carbon increase reaction device 4 of the present embodiment, a generation gas D after the multimerization reaction that flows out from the thermal reaction portion 41 is sent to the gas-liquid separation portion 42 through the gas flow path 68. An olefin having a carbon number of 6 or more is a liquid at ordinary temperatures. Therefore, for example, when the olefin having a carbon number of 6 or more is a target carbon compound, by setting the temperature of the gas-liquid separation portion 42 to about 30° C., it is possible to easily perform gas-liquid separation to an olefin (olefin liquid E1) having a carbon number of 6 or more and an olefin (olefin gas E2) having a carbon number of less than 6. Further, by increasing the temperature of the gas-liquid separation portion 42, the carbon-number of the obtained olefin liquid E1 can be increased.

When the gas G1 supplied to the $CO_2$ concentration portion 11 of the recovery device 1 is atmospheric air, the separation gas G3 sent from the $CO_2$ concentration portion 11 through the gas flow path 71 may be utilized for the cooling of the generation gas D in the gas-liquid separation portion 42. For example, by using a gas-liquid separation portion 42 including a cooling tube, causing the separation gas G3 to pass through the inside of the cooling tube, causing the generation gas D to pass through the outside of the cooling tube, and condensing the generation gas D by a surface of the cooling tube, the olefin liquid E1 is obtained. Further, since the olefin gas E2 separated by the gas-liquid separation portion 42 includes an unreacted component such as ethylene and an olefin having a smaller carbon number than that of a target olefin, the olefin gas E2 can return to the thermal reaction portion 41 through the gas flow path 70 and be reused for the multimerization reaction.

The multimerization reaction of ethylene in the thermal reaction portion 41 is an exothermic reaction in which the enthalpy of a supply material is higher than the enthalpy of a generation material, and a reaction enthalpy is negative. In the carbon dioxide process apparatus 100, a heat medium F is heated by utilizing a reaction heat generated at the thermal reaction portion 41 of the carbon increase reaction device 4, the heat medium F is circulated to the heat exchange portion 5 through the circulation flow path 69, and heat is exchanged between the heat medium F and the electrolytic solution B in the heat exchange portion 5. Thereby, the electrolytic solution B supplied to the electrochemical reaction portion 2 is heated. In the electrolytic solution B that uses a strong alkaline aqueous solution, if the temperature is increased, the dissolved carbon dioxide is not easily separated as a gas, and a reaction rate of the oxidation-reduction in the electrochemical reaction portion 2 is improved by the increase of the temperature of the electrolytic solution B.

The carbon increase reaction device 4 may further include a reaction portion that performs a hydrogenation reaction of an olefin obtained by the multimerization of ethylene by utilizing the hydrogen generated by the electrochemical reaction portion 2, or a reaction portion that performs an isomerization reaction of an olefin or a paraffin.

[Carbon Dioxide Process Method]

A carbon dioxide process method according to an embodiment of the present invention is performed, for example, by using the carbon dioxide process apparatus 100 described above. Specifically, the carbon dioxide process method of the present embodiment can preferably include: a step (a) of dissolving carbon dioxide in an electrolytic solution; a step (b) of discharging a nickel hydrogen battery that includes a positive electrode, a negative electrode, a separator that is provided between the positive electrode and the negative electrode, a positive electrode-side flow path that is formed between the positive electrode and the separator, and a negative electrode-side flow path that is formed between the negative electrode and the separator; a step (c) of charging the nickel hydrogen battery; a step (d) of reducing the carbon dioxide dissolved in the electrolytic solution by using electric energy of the nickel hydrogen battery; a step (e) of circulating, at a time of discharging of the nickel hydrogen battery, the electrolytic solution in an order of a carbon dioxide absorption portion, the negative electrode-side flow path of the nickel hydrogen battery, an electrochemical reaction device, the positive electrode-side flow path of the nickel hydrogen battery, and the carbon dioxide absorption portion; and a step (f) of circulating, at a time of charging of the nickel hydrogen battery, the electrolytic solution in an order of the carbon dioxide absorption portion, the positive electrode-side flow path of the nickel hydrogen battery, the electrochemical reaction device, the negative electrode-side flow path of the nickel hydrogen battery, and the carbon dioxide absorption portion. The carbon dioxide process method of the present embodiment can be utilized for a carbon compound manufacturing method. That is, by using the carbon dioxide process method of the present embodiment, it is possible to manufacture a carbon compound in which carbon dioxide is reduced, or a carbon compound obtained by using the carbon compound in which carbon dioxide is reduced as a raw material.

Further, in the carbon dioxide process method of the present embodiment, the electrolytic solution A that has flowed through the cathode-side liquid flow path **24*a* which is provided adjacent to the cathode 21 may be supplied to the anode-side liquid flow path 26*a* which is provided adjacent to the anode 22 in the electrochemical reduction of carbon dioxide as in the step (d) described above. Thereby, by-products such as methanol, ethanol, acetic acid, and formic acid that are generated by a reduction reaction of the cathode 21 can be oxidized by an oxidation reaction that proceeds at the anode 22** and be recovered and recycled in a form of carbon dioxide ($CO_3^{2-}$) and electron (e), and it is possible to reduce the loss of carbon dioxide and improve the energy efficiency.

Further, as in the case where the carbon dioxide process apparatus including the carbon increase reaction device 4 is used as in the carbon dioxide process apparatus 100 described above, the carbon dioxide process method of the present embodiment can preferably further include a step (g) of performing multimerization of an ethylene generated by reducing the dissolved carbon dioxide in addition to the step (a) to step (f).

The present disclosure is not limited to the above-described embodiments, and modifications and improvements within a scope in which the object of the present disclosure can be achieved are included in the present disclosure.

For example, a branch liquid flow path that is connected to the $CO_2$ absorption portion 12 via a switching valve such as a three-way valve may be provided on the first liquid supply passage 20 of the embodiment described above. Thereby, by switching the switching valve, the electrolytic solution A can be supplied directly to the $CO_2$ absorption portion 12 via the branch liquid flow path.

Further, the carbon dioxide process apparatus 100 of the embodiment described above has a configuration that includes the recovery device 1, the electric energy storage device 3, the carbon increase reaction device 4, and the heat exchange portion 5; however, the embodiment is not limited thereto. The carbon dioxide process apparatus 100 may not include all or part of the recovery device 1, the electric energy storage device 3, the carbon increase reaction device 4, and the heat exchange portion 5.

What is claimed is:

1. A carbon dioxide process apparatus comprising:

a recovery device that recovers carbon dioxide;

an electrochemical reaction device that electrochemically reduces the carbon dioxide which is recovered by the recovery device; and an electric energy storage device that supplies electric energy to the electrochemical reaction device, wherein the recovery device comprises: a carbon dioxide absorption portion that dissolves the carbon dioxide in an electrolytic solution of a strong alkali and absorbs the carbon dioxide, the carbon dioxide that is dissolved in the electrolytic solution by the carbon dioxide absorption portion is supplied to the electrochemical reaction device, the electric energy storage device comprises: an electric energy storage portion that is constituted of a nickel hydrogen battery which stores electric energy, the electric energy storage portion comprises:

a positive electrode;

a negative electrode;

a separator that is provided between the positive electrode and the negative electrode;

a positive electrode-side flow path that is formed between the positive electrode and the separator; and a negative electrode-side flow path that is formed between the negative electrode and the separator, at a time of discharging of the electric energy storage portion, the electrolytic solution is circulated in an order of the carbon dioxide absorption portion, the negative electrode-side flow path of the electric energy storage portion, the electrochemical reaction device, the positive electrode-side flow path of the electric energy storage portion, and the carbon dioxide absorption portion, at a time of charging of the electric energy storage portion, the electrolytic solution is circulated in an order of the carbon dioxide absorption portion, the positive electrode-side flow path of the electric energy storage portion, the electrochemical reaction device, the negative electrode-side flow path of the electric energy storage portion, and the carbon dioxide absorption portion, the electrochemical reaction device comprises:

a cathode;

an anode;

an electrolyte film that is provided between the cathode and the anode;

a cathode-side liquid flow path which is provided adjacent to the cathode and through which the electrolytic solution flows;

an anode-side liquid flow path which is provided adjacent to the anode and through which the electrolytic solution flows; and a first liquid supply passage that supplies the electrolytic solution which has flowed through the cathode-side liquid flow path to the anode-side liquid flow path, the cathode-side liquid flow path and the anode-side liquid flow path are provided across the cathode, the electrolyte film, and the anode and are connected to each other by the first liquid supply passage, the carbon dioxide process apparatus comprises: a second liquid supply passage that connects the anode-side liquid flow path to the positive electrode-side flow path at the time of discharging and connects the anode-side liquid flow path to the negative electrode-side flow path at the time of charging, at the time of discharging, the electrolytic solution supplied to the anode-side liquid flow path through the first liquid supply passage from the cathode-side liquid flow path is supplied to the positive electrode-side flow path through the second liquid supply passage, and at the time of charging, the electrolytic solution supplied to the anode-side liquid flow path through the first liquid supply passage from the cathode-side liquid flow path is supplied to the negative electrode-side flow path through the second liquid supply passage.

2. The carbon dioxide process apparatus according to claim 1, wherein the electric energy storage device further comprises: a conversion portion that converts renewable energy into electric energy, and the electric energy storage portion stores the electric energy converted by the conversion portion.

3. The carbon dioxide process apparatus according to claim 1, further comprising:

a carbon increase reaction device that performs a carbon increase by performing multimerization of an ethylene generated by reducing the carbon dioxide by the electrochemical reaction device.

4. A carbon dioxide process method that electrochemically reduces carbon dioxide, the carbon dioxide process method comprising:

in a carbon dioxide absorption portion, dissolving carbon dioxide in an electrolytic solution;

discharging a nickel hydrogen battery that comprises a positive electrode, a negative electrode, a separator that is provided between the positive electrode and the negative electrode, a positive electrode-side flow path that is formed between the positive electrode and the separator, and a negative electrode-side flow path that is formed between the negative electrode and the separator;

charging the nickel hydrogen battery;

in an electrochemical reaction device, reducing the carbon dioxide dissolved in the electrolytic solution by using electric energy of the nickel hydrogen battery;

at a time of discharging of the nickel hydrogen battery, circulating the electrolytic solution in an order of the carbon dioxide absorption portion, the negative electrode-side flow path of the nickel hydrogen battery, the electrochemical reaction device, the positive electrode-side flow path of the nickel hydrogen battery, and the carbon dioxide absorption portion; and at a time of charging of the nickel hydrogen battery, circulating the electrolytic solution in an order of the carbon dioxide absorption portion, the positive electrode-side flow path of the nickel hydrogen battery, the electrochemical reaction device, the negative electrode-side flow path of the nickel hydrogen battery, and the carbon dioxide absorption portion.

5. A carbon compound manufacturing method comprising:

reducing carbon dioxide and manufacturing a carbon compound by the carbon dioxide process method according to claim 4.

* * * * *